United States Patent
Niyogi et al.

(10) Patent No.: US 7,197,702 B2
(45) Date of Patent: Mar. 27, 2007

(54) WEB PAGE RENDERING MECHANISM USING EXTERNAL PROGRAMMATIC THEMES

(75) Inventors: Shanku S. Niyogi, Bellevue, WA (US); Ting-Hao Yang, Kirkland, WA (US); David Serge Ebbo, Redmond, WA (US); Scott David Guthrie, Bellevue, WA (US); Robert M. Howard, Snoqualmie, WA (US); Joseph K. Croney, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 406 days.

(21) Appl. No.: 10/461,781

(22) Filed: Jun. 13, 2003

(65) Prior Publication Data

US 2005/0015722 A1  Jan. 20, 2005

(51) Int. Cl.
- G06F 15/00 (2006.01)
- G06F 17/00 (2006.01)
- G06F 3/00 (2006.01)
- G06F 9/45 (2006.01)

(52) U.S. Cl. .......... 715/517; 715/514; 715/744; 709/203; 717/108; 717/148

(58) Field of Classification Search ........ 715/517, 715/530, 513–514, 713, 740, 744, 747, 808–809; 707/104.1, 1, 3; 709/203; 717/100, 106, 717/107, 108, 114, 115, 116, 148
See application file for complete search history.

(56) References Cited

U.S. PATENT DOCUMENTS

| | | | |
|---|---|---|---|
| 5,428,730 A * | 6/1995 | Baker et al. ............. | 715/740 |
| 6,230,309 B1 * | 5/2001 | Turner et al. ............ | 717/107 |
| 6,237,135 B1 * | 5/2001 | Timbol .................... | 717/107 |
| 6,349,408 B1 * | 2/2002 | Smith ...................... | 717/174 |
| 6,353,923 B1 * | 3/2002 | Bogle et al. ............. | 717/128 |
| 6,697,825 B1 * | 2/2004 | Underwood et al. ..... | 715/530 |
| 7,120,897 B2 * | 10/2006 | Ebbo et al. .............. | 717/108 |
| 2003/0014442 A1 * | 1/2003 | Shiigi et al. ............. | 707/513 |
| 2003/0037041 A1 * | 2/2003 | Hertz ........................ | 707/1 |
| 2004/0133660 A1 * | 7/2004 | Junghuber et al. ...... | 709/219 |

(Continued)

OTHER PUBLICATIONS

Christophe Lauer, "Introducing Microsoft DotNet," Jul. 2002, pp. 1-10.*

(Continued)

*Primary Examiner*—William Bashore
*Assistant Examiner*—Maikhanh Nguyen
(74) *Attorney, Agent, or Firm*—Workman Nydegger

(57) ABSTRACT

A web page rendering mechanism in which a computing system generating a web page from a web page definition. A web page class is compiled from the web page definition. The theme-specific properties are described separate from the web page definition in theme-oriented text documents that are compiled into a theme class. The web page is rendered by executing an instance of the web page class in conjunction with an instance of the theme class. The web page object may include an object for each control element to be rendered. In addition, the theme object may include an object for control elements of each control element type. When rendering a control element of a particular type, the object corresponding to that control element is executed from the web page object. In addition, the object corresponding to the control element type is executed from the theme object.

9 Claims, 5 Drawing Sheets

U.S. PATENT DOCUMENTS

| | | | |
|---|---|---|---|
| 2004/0172415 A1* | 9/2004 | Messina et al. | 707/104.1 |
| 2004/0225995 A1* | 11/2004 | Marvin et al. | 717/100 |
| 2004/0250205 A1* | 12/2004 | Conning | 715/517 |
| 2005/0005243 A1* | 1/2005 | Olander et al. | 715/747 |
| 2005/0044173 A1* | 2/2005 | Olander et al. | 709/217 |
| 2005/0108648 A1* | 5/2005 | Olander et al. | 715/744 |

OTHER PUBLICATIONS

Dahalin et al., "Workflow Interoperability Using Extensible Markup Language (XML)", IEEE, Jul. 2002, pp. 513-516.*

Roman et al., "The Technical Benefits of EJB and J2EE Technologies over COM+ and Windows DNA," Dec. 1999, ☐☐pp. 1-24.*

Maurer et al., "Component-Level Programming: A Revolution in Software Technology", Department of Computer Science & Engineering, University of South Florida, Tampa, FL, Nov. 1999, pp. 1-5.*

Stephen Walther, "ASP.NET", 2002, pp. 278-307.*

A Visual Basic Custom Control for Interfacing With GPS Receivers Sergio M. Paz, Antonio M. Saraiva, Carlos E. Cugnasca, Bruno A. Basseto pp. 242-249 Seventh International Conference on Computers in Agriculture.

Can Data Representation and Interface Demands Be Reconciled? Approach in ORCA A.M. van Ginneken, M. De Wilde, E.M. van Mulligan, H. Stam Department of Medical Inofrmatics Erasmus University, Rotterdam, The Netherlands pp. 779-783, 1997 AMIA.

* cited by examiner

WEB PAGE RENDERING MECHANISM USING EXTERNAL PROGRAMMATIC THEMES

BACKGROUND OF THE INVENTION

1. The Field of the Invention

The present invention relates to web page rendering technology. More specifically, the present invention relates to mechanisms into which themes may be applied to a web page without having the specific attributes associated with the theme specified in the web page definition.

2. Background and Related Art

Computing technology has transformed the way we work and play. For example, a user with a network or Internet-enabled computing system or device with a browser may navigate to thousands of different web sites spread throughout the globe. Navigation involves sending a web page request to a server that maintains the web site, and then receiving markup language representing the web page from the server. The browser then displays the web page on the screen using the markup language representation of the web page.

Conventionally, web pages include interactive elements that when rendered result in control elements that allow a user to have some level of interaction with the web page. For example, the control element may include a button that the user can select with the mouse to perform some function (e.g., a "go" button, a "help" button, a "send" button" and "submit" button, a "next" button or the like). A control element may also be a text box into which a user can input textual information such as address, phone number, search terms, product name, or the like. A control element may also be a label. A more complex control element may be a calendar through which a user may navigate by selecting various views or enter calendar or appointment entries.

There are many technologies that enable the insertion of such controls into a web page. One conventional approach is illustrated with respect to FIG. 5, in which a web page text document 501 (specifically, an ASPX web page document) is convened into a control collection 502, which is then used to render a web page 503 in the form of the markup language (e.g., HyperText Markup Language) that may be directly interpreted by a browser.

In this example, the web page text document 501 includes a reference to a number of control elements including control elements references 512 through 515 that may be interspersed between other static markup language 511 as represented by the vertical ellipses 511A through 511E. Each of the control element references includes one or more attributes specifying behaviors of the control elements. Each of the control element references has an attribute "runat" having a value that indicates that the control element is to be rendered at the server into markup language that can be directly interpreted by the browser. Furthermore, control element reference 512 references a label control element having a identifier attribute of "input" and having a text attribute of "Name:". The control element reference 513 references a TextBox control element. Control element reference 514 references a calendar control element. Control element reference 515 references a button control element having a text attribute of "Go", and having an OnClick attribute that results in a function called "foo" being executed when the user clicks on the corresponding visual representation of the button control element. The function "foo" may be internal or external to the web page text document 501.

The web page text document 501 is parsed and compiled as represented by the arrow 515 into a control collection 502. The control collection 502 includes a number of object classes including the overarching page object class 520 that instantiates page objects that when executed (as represented by arrow 525) renders the web page 503 into the markup language that may be directly interpreted by the browser. For clarity, the web page 503 is illustrated as it would ultimately be presented by the browser, rather than as it is at this stage, namely, a markup language document.

The page object class 520 includes several descendent object classes including a literal class 521 that instantiates literal objects that when executed renders the static markup language portions 531 (as represented by portions 531A and 531B in the web page 503). The page object class 520 includes a descendent label class 522 that instantiates a label object that when executed renders the Label control element 532. The page object class 520 includes a descendent TextBox class 523 that instantiates a TextBox object that when executed renders the TextBox control element 533. The page object class 520 includes a descendent Calendar object class 524 that instantiates a calendar object that when executed renders the Calendar control element 534. Furthermore, the page object class 520 includes a descendent Button object class 525 that instantiates a button object that when executed renders the Calendar control element 535.

The rendering technology just described is advantageous as it allows flexibility in the functionality of the control elements. In addition, further control elements may be defined as needed for a particular web page. The control elements allow for further attributes that affect the overall look of the control element. For example, the control elements may have an attribute for background color, foreground color, font size, font type, text content, image, templates, complex properties, or the like. By applying specific attributes to the various control elements, the look and feel of the web page may be customized, and may even become recognized as being associated with a particular organization or product thereby enhancing brand recognition.

However, in order to apply a similar look or theme to another related web page, the related web page would also have control elements with similar attribute settings. Should the overall theme for these related web pages be desired to be changed, each web page would typically be altered by meticulously changing the attributes for the control elements in each document. This can be quite time consuming.

Accordingly, what would be advantageous is a mechanism for applying themes in a web page document in a manner that the theme may be consistently and more easily applied across multiple related documents and in which changes to the theme may be more easily applied across all related web page text documents. It would further be advantageous if the theme may be applied in the context of a page object class having one or more descendent control element classes thereby retaining the benefit of flexibility in the type and mechanism for rendering control elements, and the corresponding flexible functionality enabled by the control elements.

BRIEF SUMMARY OF THE INVENTION

The foregoing problems with the prior state of the art are overcome by the principles of the present invention which are directed towards a web page rendering mechanism in which a computing system generates a web page from a web page definition in a manner that a theme is applied to the web page without properties associated with the theme being required in the web page definition.

The web page definition references control elements such as labels, buttons, text boxes, calendars or the like. During the rendering process, it is determined that the web page corresponding to the web page definition is to have a theme applied. This may be determined by default (e.g., using a configuration setting) or by detecting a directive indicating that a theme is to be applied. In response, one or more theme-oriented text documents is accessed. The theme-oriented documents collectively describe properties or attributes associated with control elements and that advance the desired look and feel of the theme. Such attributes may include background color, foreground color, font size, font type, images, templates, complex properties, or the like, and may be specified for each type of control element. They may also include more complex behaviors such as whether the calendar display is initialized in daily mode with details about the day, or whether the calendar display initializes in weekly or monthly mode.

Then, a theme class is generated and compiled based on the one or more theme-oriented documents. A theme object is instantiated from the theme class. The theme object includes portions that, when executed, result in the application of the specific theme-oriented properties to the control element. The control element with its theme properties properly set may then be executed when called by an object instance that renders the control element. In one example, the theme object includes descendent objects that correspond to a particular control element type.

The rendering mechanism also generates a web page object based on the web page definition. The web page object includes an object that renders the control element and that includes a function call to the theme object that applies the theme-oriented properties to the control element. The web page is then rendered by executing the instance of the web page class.

Additional features and advantages of the invention will be set forth in the description that follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

Figure 1:
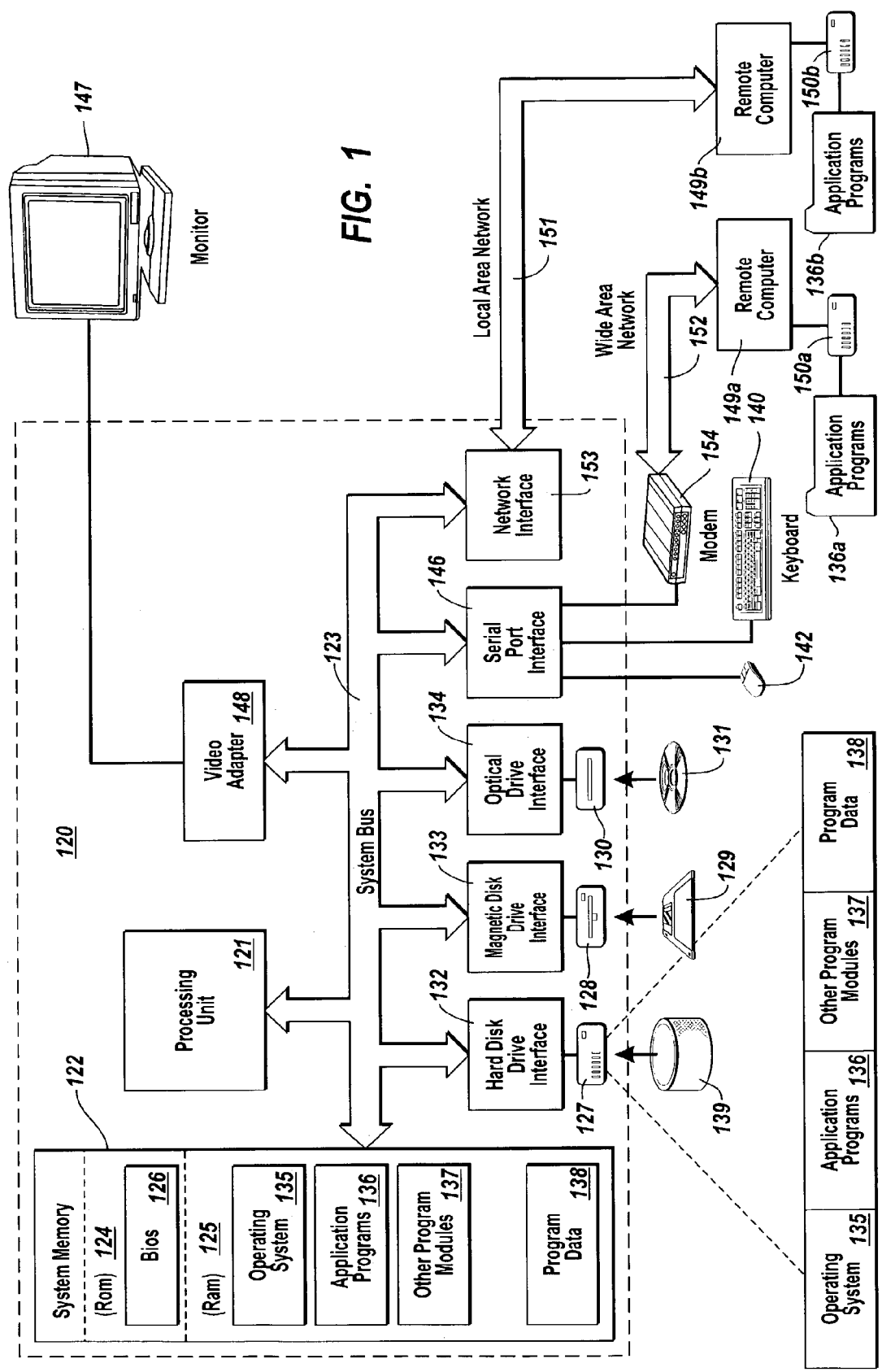
FIG. 1 illustrates a suitable computing system that may implement that features of the present invention.

The principles of the present invention relate to a web page rendering mechanism in which a computing system generating a web page from a web page definition. The rendering process renders control elements with a particular theme without requiring that the theme-specific properties of the control element to be included within the web page definition. Instead, the theme-specific properties are described in one or more theme-oriented text documents. The theme-oriented text documents are compiled into a theme class, while the web page definition is compiled into a web page class. The web page is rendered by executing an instance of the web page class in conjunction with an instance of the theme class.

Embodiments within the scope of the present invention include computer-readable media for carrying or having computer-executable instructions or data structures stored thereon. Such computer-readable media can be any available media which can be accessed by a general purpose or special purpose computer. By way of example, and not limitation, such computer-readable media can comprise physical computer-readable media such as RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer.

When information is transferred or provided over a network or another communications connection (either hardwired, wireless, or a combination of hardwired or wireless) to a computer, the computer properly views the connection as a computer-readable medium. Thus, any such a connection is properly termed a computer-readable medium. Combinations of the above should also be included within the scope of computer-readable media. Computer-executable instructions comprise, for example, any instructions and data which cause a general purpose computer, special purpose computer, or special purpose processing device to perform a certain function or group of functions. The computer-executable instruction may be, for example, binaries, intermediate format instructions such as assembly language, or even source code. Although not required, the invention will be described in the general context of computer-executable instructions, such as program modules, being executed by computers in network environments. Generally, program modules include routines, programs, objects, components, data structures, etc. that perform particular tasks or implement particular abstract data types.

Those skilled in the art will appreciate that the invention may be practiced in network computing environments with many types of computer system configurations, including personal computers, hand-held devices, multi-processor systems, microprocessor-based or programmable consumer electronics, network PCs, minicomputers, mainframe computers, and the like. The invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

FIG. 1 illustrates suitable computing environment in which the principles of the present invention may be employed in the form of a computer 120. The computer 120 includes a processing unit 121, a system memory 122, and a system bus 123 that couples various system components including the system memory 122 to the processing unit 121.

The system bus 123 may be any of several types of bus structures including a memory bus or memory controller, a peripheral bus, and a local bus using any of a variety of bus architectures. The system memory includes read only memory (ROM) 124 and random access memory (RAM) 125. A basic input/output system (BIOS) 126, containing the basic routines that help transfer information between elements within the computer 120, such as during start-up, may be stored in ROM 124.

The computer 120 may also include a magnetic hard disk drive 127 for reading from and writing to a magnetic hard disk 139, a magnetic disk drive 128 for reading from or writing to a removable magnetic disk 129, and an optical disk drive 130 for reading from or writing to removable optical disk 131 such as a CD-ROM or other optical media. The magnetic hard disk drive 127, magnetic disk drive 128, and optical disk drive 130 are connected to the system bus 123 by a hard disk drive interface 132, a magnetic disk drive-interface 133, and an optical drive interface 134, respectively. The drives and their associated computer-readable media provide nonvolatile storage of computer-executable instructions, data structures, program modules and other data for the computer 120. Although the exemplary environment described herein employs a magnetic hard disk 139, a removable magnetic disk 129 and a removable optical disk 131, other types of computer readable media for storing data can be used, including magnetic cassettes, flash memory cards, digital video disks, Bernoulli cartridges, RAMs, ROMs, and the like.

Program code means comprising one or more program modules may be stored on the hard disk 139, magnetic disk 129, optical disk 131, ROM 124 or RAM 125, including an operating system 135, one or more application programs 136, other program modules 137, and program data 138. A user may enter commands and information into the computer 120 through keyboard 140, pointing device 142, or other input devices (not shown), such as a microphone, joy stick, game pad, satellite dish, scanner, or the like. These and other input devices are often connected to the processing unit 121 through a serial port interface 146 coupled to system bus 123. Alternatively, the input devices may be connected by other interfaces, such as a parallel port, a game port or a universal serial bus (USB). A monitor 147 or another display device is also connected to system bus 123 via an interface, such as video adapter 148. In addition to the monitor, personal computers typically include other peripheral output devices (not shown), such as speakers and printers.

The computer 120 may operate in a networked environment using logical connections to one or more remote computers, such as remote computers 149*a* and 149*b*. Remote computers 149*a* and 149*b* may each be another personal computer, a server, a router, a network PC, a peer device or other common network node, and typically include many or all of the elements described above relative to the computer 120, although only memory storage devices 150*a* and 150*b* and their associated application programs 136*a* and 136*b* have been illustrated in FIG. 1. The logical connections depicted in FIG. 1 include a local area network (LAN) 151 and a wide area network (WAN) 152 that are presented here by way of example and not limitation. Such networking environments are commonplace in office-wide or enterprise-wide computer networks, intranets and the Internet.

When used in a LAN networking environment, the computer 120 is connected to the local network 151 through a network interface or adapter 153. When used in a WAN networking environment, the computer 120 may include a modem 154, a wireless link, or other means for establishing communications over the wide area network 152, such as the Internet. The modem 154, which may be internal or external, is connected to the system bus 123 via the serial port interface 146. In a networked environment, program modules C depicted relative to the computer 120, or portions thereof, may be stored in the remote memory storage device. It will be appreciated that the network connections shown are exemplary and other means of establishing communications over wide area network 152 may be used.

While FIG. 1 represents a suitable operating environment for the present invention, the principles of the present invention may be employed in any computing system that is capable of browsing to network sites. The computing system illustrated in FIG. 1 is illustrative only, and by no means represents even a small portion of the wide variety of environments in which the principles of the present invention may be implemented. In the description and in the claims, a "computing system" is defined broadly as any hardware component or components that are capable of using software to perform one or more functions. Examples of computing systems include desktop computers, laptop computers, Personal Digital Assistants (PDAs), telephones, or any other system or device that has processing capability.

Figure 2:
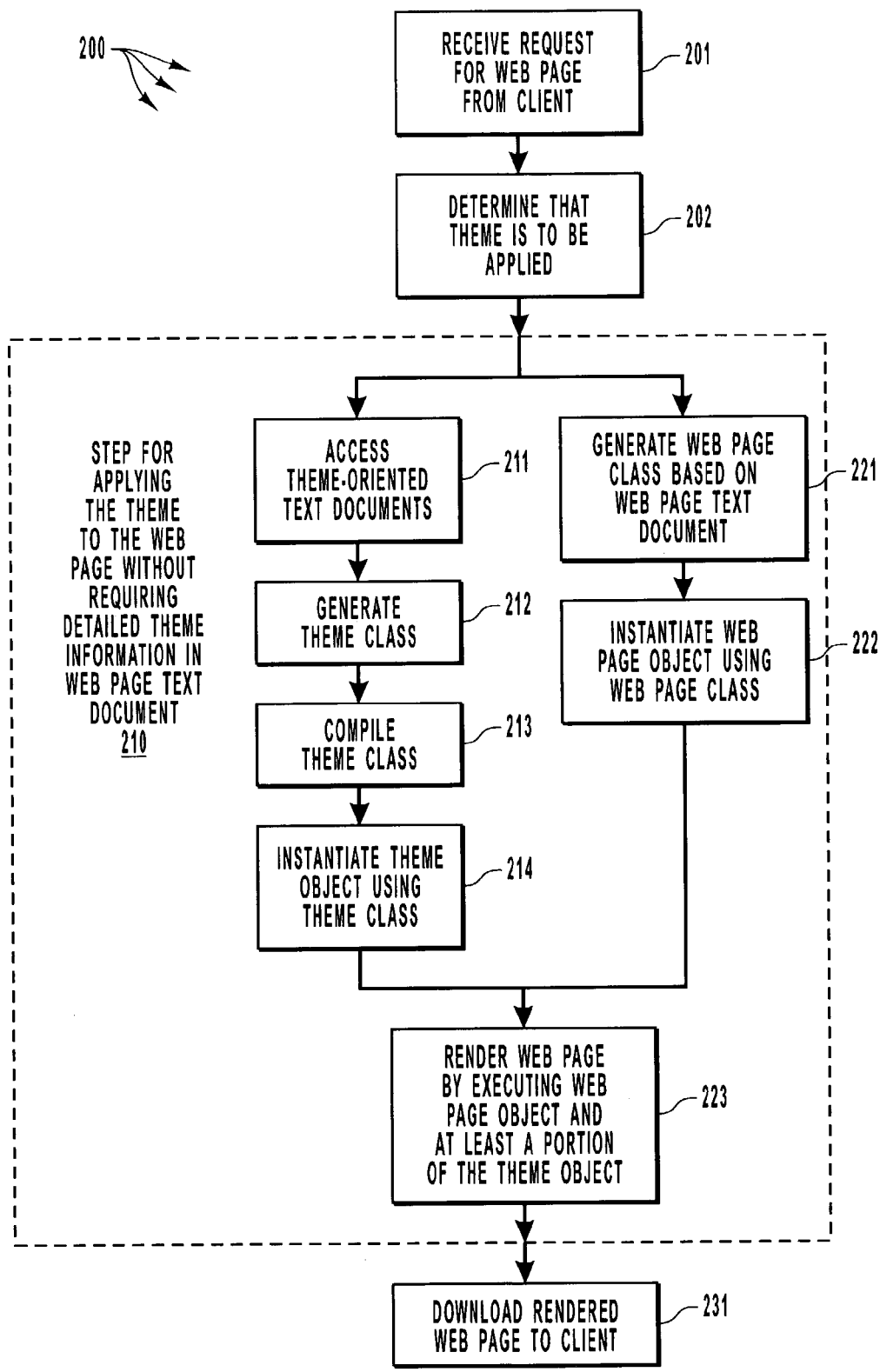
FIG. 2 illustrates a flowchart of a method for rendering a web page with a theme in accordance with the principles of the present invention.
Figure 3:
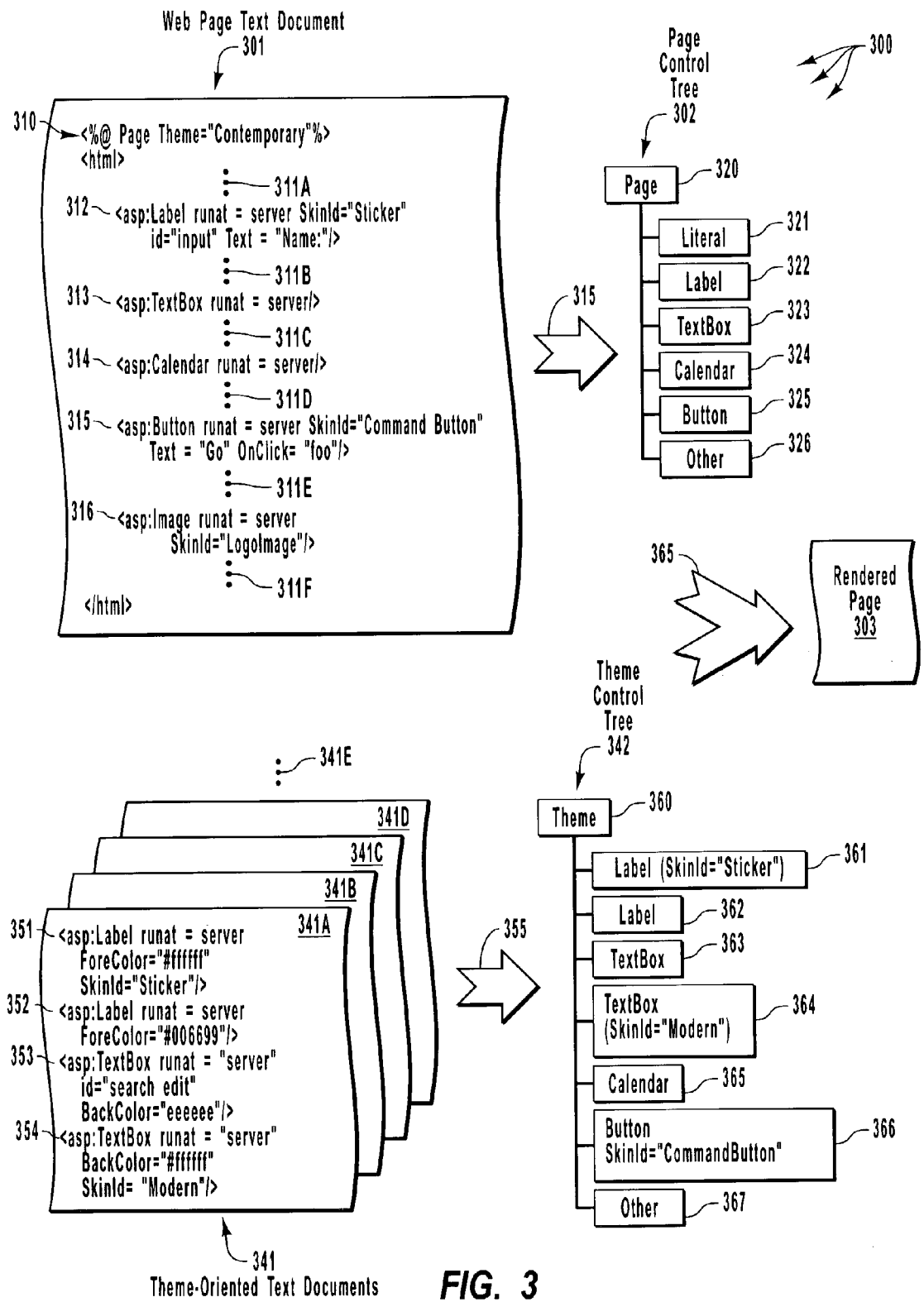
FIG. 3 illustrates a data structure processing flow associated with the rendering process in accordance with the principles of the present invention.

FIG. 2 illustrates a flowchart of a method 200 for a generating a web page from a web page definition in a manner that a theme is applied to the web page without properties associated with the theme being included in the web page definition. FIG. 3 illustrates a data structure process flow 300. The data structure processor flow 300 of FIG. 3 will be described with frequent reference to the method 200 of FIG. 2.

The data structure process flow 300 includes a web page text document 301 that serves as an example of a web page definition. In one embodiment, the web page text document is an ASPX web page document although that is not required. The web page definition may also be extracted from a database or web service. However, in the illustrated embodiment, the web page definition takes the form of the web page text document and thus the principles of the present invention will be described with respect to the web page text document. However, those or ordinary skill in the art will recognize, after having reviewed this description, that the web page from any other web page definition while remaining firmly within the scope of the present invention. The web page text document 301 includes a directive 310 indicating that a theme is to be applied and that the name of the theme is "Contemporary". The computing system has access to a number of theme-oriented Text documents 341 that correspond to this theme. There may be other theme-oriented documents associated with one or more other themes as well. In one embodiment, all theme-oriented documents are located in a common directory. The directory may have a number of subdirectories, one for each possible theme. Although a number of theme-oriented documents (specifically, documents 341A through 341D among potentially other as indicated by the ellipses 341E), there may be only one or any other number of theme-oriented documents as may be convenient.

Referring to FIG. 2, the method 200 includes an act of receiving a request for a web page from a client computing system (act 201). This web page is dynamically generated from a web page text document such as the web page text document 301 of FIG. 3. In current request/response-oriented protocols (such as HyperText Transport Protocol (HTTP) common for retrieving Web pages over networks), Web pages are often retrieved in response to a request. However, the principles of the present invention are not limited to application in a request/response oriented environment. The web page may be dynamically constructed for some other reason unrelated to the fulfillment of any particular request received over a network.

When the computing system determines that a web page corresponding to the web page text document is to be constructed (either in response to a request or otherwise), the computing system then determines that the web page corresponding to the web page text document is to have a theme applied (act 202). This may be accomplished by the computing system reading a directive in the corresponding web page text document. For example, for the web page text document 301, the directive 310 may be read and evaluated. Alternatively, a default rule (e.g., as stated by a configuration setting) may indicate that a theme is to be applied. In that case, if the computing system determines that there is nothing that contravenes the default rule, then the computing system may correspondingly determine that a theme is to be applied. As previously mentioned, there may be multiple themes available for rendering. Accordingly, the directive or default rule may also specify which theme is to be applied.

The computing system then performs a functional, result-oriented step for applying the theme to the web page text document without requiring detailed theme information in the web page text document (step 210). This may include any corresponding acts of accomplishing this result. However, in the illustrated embodiment, the step 210 includes corresponding acts 211 through 214 and 221 through 223.

Specifically, the computing system accesses one of more theme-oriented text documents that correspond to the theme and that collectively describe at least one property to be applied to a control element of the web page text document (act 211). In FIG. 3, the theme-oriented text documents are represented by theme-oriented text documents 341.

The content of the first theme-oriented text document 341A is illustrated. Note how the format of the control element references in the theme-oriented document 341A is similar, if not identical, to the format of the control references in the web page text document 301 for control elements of a common type. Indeed, the schema of the control element references in the theme-oriented document 341A may be identical to the schema of the control element references of the web page text document 301 for any given type.

For example, the schema of the control element reference includes for each document, a server side control element having the "asp:" prefix. The control element references contain zero or more attributes, a "runat" attribute that has a value that indicates where the corresponding control element is to be rendered into markup language directly interpretable by a browser. In the illustrated embodiment, the "runat" attribute for all control element references has a value of "server" indicating that the entire rendering process for all control elements is to be handled by the computing system that hosts the web page, rather than by any remote browser. Since the schema of the control element references is similar or even identical, the theme-oriented documents may be quite easily constructed by simple cut and paste or copy operations, with minor edits to specify theme-oriented properties.

The computing system then generates a theme class based on the one or more theme-oriented text documents (act 212). The theme class may be represented in source code or other compilable instructions. In one embodiment, the theme class is generated in C#. The theme class is then compiled into a theme class that may be used to instantiate theme objects (act 213). Then a theme object is instantiated using the compiled theme class (act 214). This class generation, compiling, and instantiation operation is represented in FIG. 3 by arrow 355 and results in a theme control collection 342 being generated.

The theme control collection 342 includes a theme object 360 at its root. The theme object 360 includes several descendent control element objects 361 through 367.

For example, the label control element 361 corresponds to a particular skin having a skin identifier of "Sticker". The label control element 361 is generated by subjecting the control element reference 351 in the original theme-oriented text document 341A to the class generation, compilation, and instantiation process of acts 212 through 214. As indicated in the label control element reference 351, the label control element, when executed, will apply a certain foreground color to any label control element that invokes the "Sticker" skin.

The label control element 362 does not correspond to any particular skin. Accordingly, the label control element 362 is applied by default to any label control element that does not specify a skin identifier, or that specifies a non-existent skin identifier. The label control element 362 is generated by subjecting the control element reference 352 in the original theme-oriented text document 341A to the class generation, compilation, and instantiation process. As indicated in the label control element reference 352, the label control element, when executed, will apply another certain foreground color to the label.

The TextBox control element 363 does not correspond to any particular skin. Accordingly, the TextBox control element 363 is applied by default to any TextBox control element that does not specify a skin identifier, or that specifies a non-existent skin identifier. The TextBox control element 363 is generated by subjecting the control element reference 353 in the original theme-oriented text document 341A to the class generation, compilation, and instantiation process. As indicated in the TextBox control element reference 353, the TextBox control element, when executed, will apply another certain background color to the lable.

The TextBox control element 364 corresponds to a particular skin having a skin identifier of "Modern". The TextBox control element 364 is generated by subjecting the control element reference 354 in the original theme-oriented text document to the class generation, compilation, and instantiation process. As indicated in the TextBox control element reference 354, the TextBox control element, when executed, will apply a certain background color to any TextBox control element that invokes the "Modern" skin.

The Calendar object 365 is also generated by subjecting a corresponding Calendar control element reference (not shown) of one of the theme-oriented text documents 341 to the class generation, compilation, and instantiation process of acts 212 through 214. The Calendar object 365 does not correspond to a particular skin and thus is applied by default.

The Button object 366 is generated by subjecting a corresponding button control element reference (not shown) of one of the theme-oriented text documents 341 to the class generation, compilation, and instantiation process, and corresponds to a skin having an identifier "CommandButton".

The Other object 367 represents that one or more other control element objects may also be generated by subjecting corresponding one or more other control element references (not shown) of the one or theme-oriented text documents to the class generation, compilation, and instantiation process.

In FIG. 2, the theme object is instantiated (act 214) after having accessed the theme-oriented documents (act 211), generating the theme class (act 212) and compiling the theme class (213). However, the accessing, generation, and compiling operations of acts 211 through 213 need not be repeated if the theme class already exists due to a previous execution of acts 211 through 213.

The computing system also generates a web page class upon which an instance of a web page object may be generated based on the web page text document (act 221). The web page class may be compiled directly from the web page document. Alternatively, the web page class may be generated by first generating an uncompiled web page class (e.g., may include source code or other compilable text) based on the web page text document, and then compiling the uncompiled web page class into the web page class.

Then, the computing system instantiates a web page object using the web page class (act 222). The web page may be rendered (i.e., into the markup language that may be directly interpreted by a browser) by executing the web page object (act 223). If the web page rendering is in response to a client request as in act 201, then the rendered web page may then be downloaded to the client (act 231).

For example, referring to FIG. 3, the web page text document 301 may be subjected to the class generation and instantiation processes of acts 221 and 222 as represented by arrow 315 to generate a page control collection 302 that includes the page object 320 as its root node.

The page object 320 includes several descendent objects including a literal object 321 that, when executed, renders the static markup language portions of the rendered page 303. That literal object is generated by subjecting static portions 311A through 311F of the web page text document 301 to the class generation and instantiation processes of acts 221 and 222.

A descendent label control element object 322, when executed, renders a Label control element of the rendered page 303. The label control element object 322 is generated by subjecting Label control element reference 312 to the class generation and instantiation process. The label control element will apply the text "Name:" to the label and will be identified by an identifier "input" as represented by the attributes of the Label control element reference 312. Note also that the Label control element reference 312 has a corresponding skin identifier attribute of "Sticker". Accordingly, when executing the label control element object 322 to generate the Label control element in the rendered web page 303, the Label control element object 361 of the theme object 360 will also be executed to thereby apply the Sticker skin to the Label object.

A descendent TextBox control element object 323, when executed, renders a TextBox control element of the rendered page 303. The TextBox control element object 323 is generated by subjecting TextBox control element reference 313 to the class generation and instantiation process. The TextBox control element reference 313 has no corresponding skin identifier attribute. Accordingly, when executing the TextBox control element object 323 to generate the TextBox control element in the rendered web page 303, the default TextBox control element object 363 of the theme object 360 will also be executed to thereby apply the theme to the Label object.

A calendar control element object 324, when executed, renders a calendar control element of the rendered page 303. The calendar control element object 324 is generated by subjecting calendar control element reference 314 to the class generation and instantiation process. The calendar control element reference 314 has no corresponding skin identifier attribute. Accordingly, when executing the calendar control element object 324 to generate the calendar control element in the rendered web page 303, the default calendar control element object 365 of the theme object 360 will also be executed to thereby apply the theme to the calendar object.

A button control element object 325, when executed, renders a button control element of the rendered page 303. The button control element object 324 is generated by subjecting button control element reference 315 to the class generation and instantiation process. The button control element reference 315 has a corresponding skin identifier attribute of "CommandButton". Accordingly, when executing the button control element object 325 to generate the button control element in the rendered web page 303, the button control element object 366 of the theme object 360 will also be executed to thereby apply the theme to the button control element object.

An other control element object 326 represents one or more other control elements object that may be generated based on other control element references in the web page text document 301. For example, image control element reference 316 indicates the use of an image at a certain location in the web page. The image control element reference 316 identifies a skin of "LogoImage". Accordingly, there would be a corresponding theme control element reference in one of the theme-oriented documents 341. The corresponding theme control element reference would be an image control element reference and would identify a particular image file to render for the image control element. The image may be, for example, a logo.

When the web page object 320 is executed as in act 223, each of the control elements would be rendered by executing the corresponding control element of the page object, as well as the corresponding theme control element object of the theme-oriented documents. In this manner, the common theme of multiple web pages may be easily changed by simply changing a single set of theme oriented documents. Furthermore, the theme-oriented documents may be quite easily and intuitively generated since the control element references in the theme-oriented text documents may follow the same schema as the control element references in the web page text document for a particular control element type.

The principles of the present invention may be further clarified through the use of a specific example that generates a specific user interface.

Figure 4B:
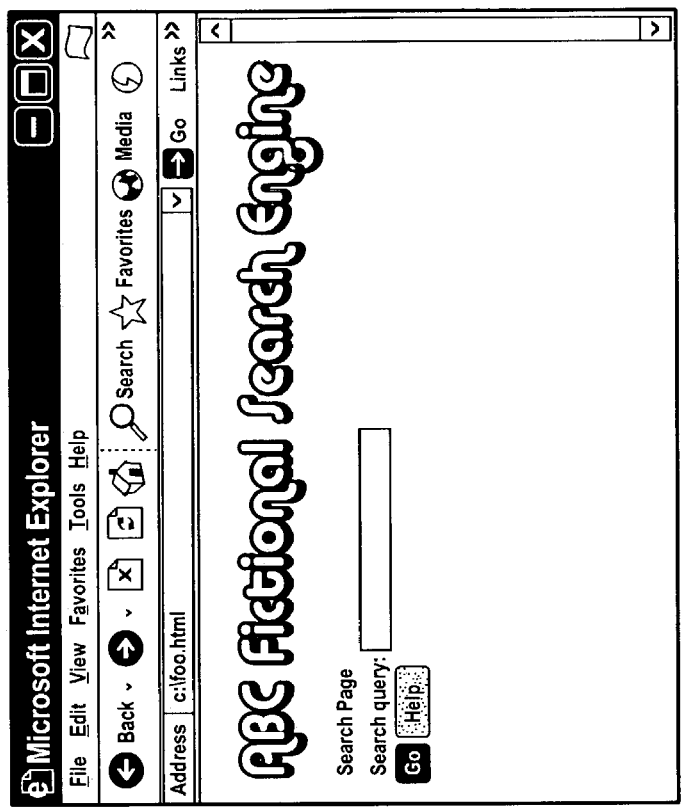
FIG. 4B illustrates the user interface of FIG. 4A with a theme applied.
Figure 4A:
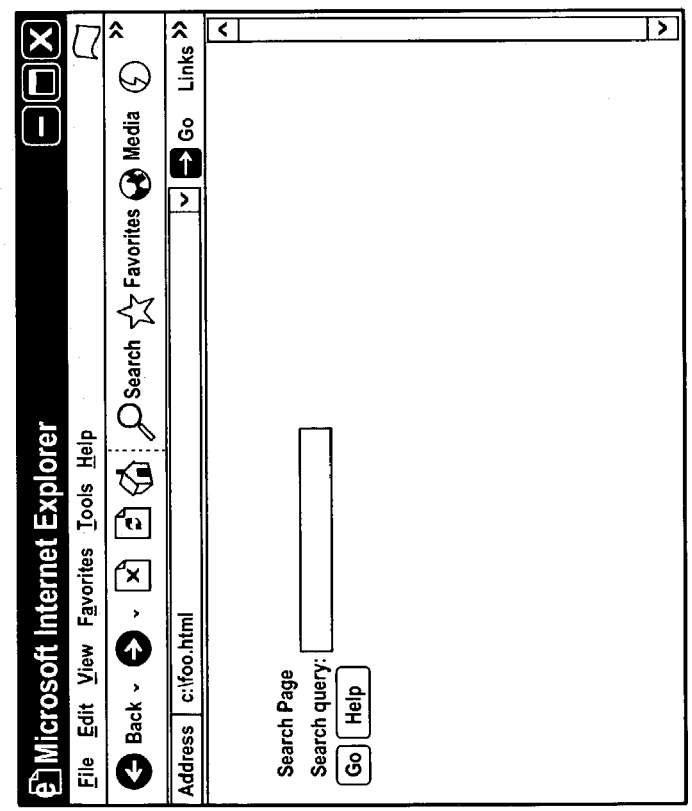
FIG. 4A illustrates a user interface without a theme applied.
Figure 5:
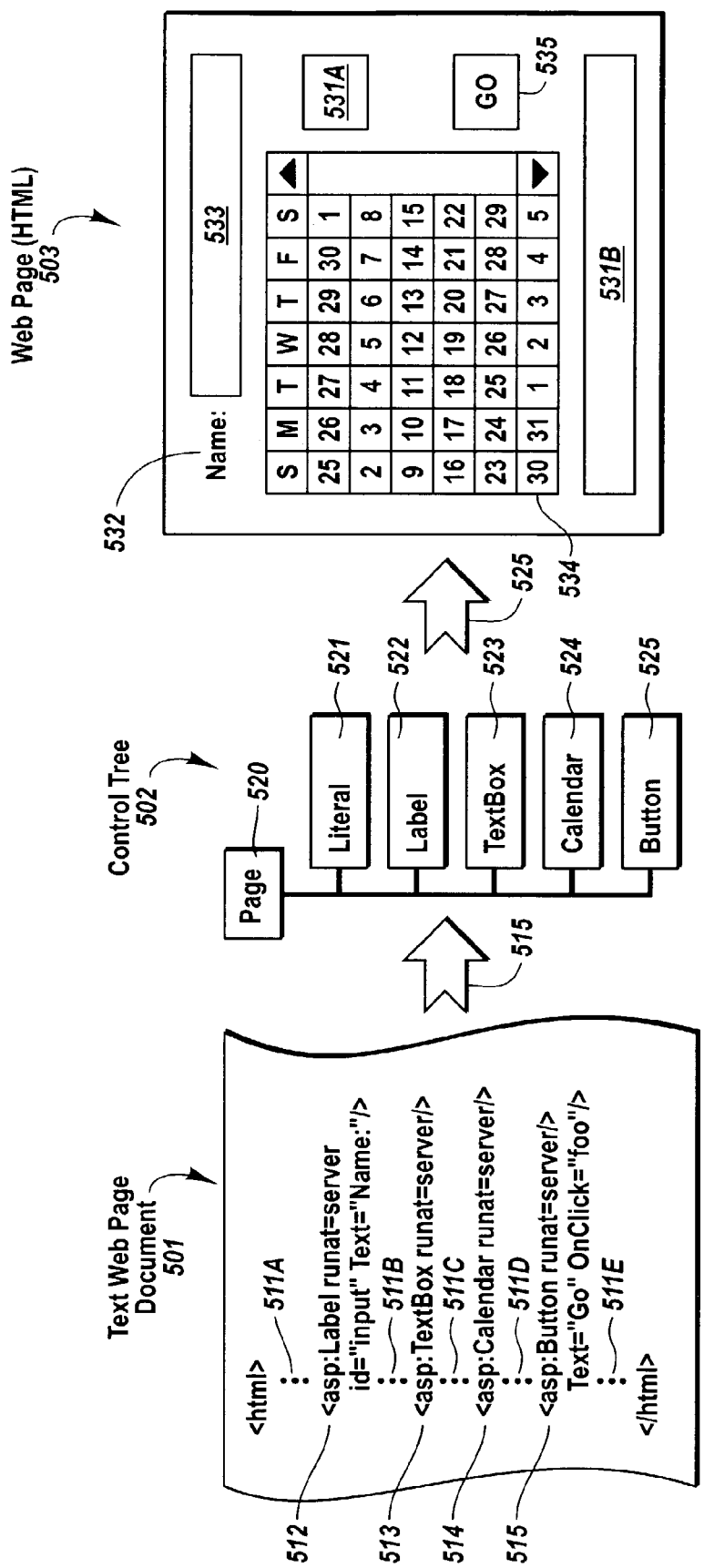
FIG. 5 illustrates a data structure processing flow associated with the rendering process in accordance with the prior art.

FIG. 4A illustrates a user interface without a theme applied. The user interface may be generated by performing the above described process with respect to a web page text document. The specific web page text document is set forth as follows:

```
<form runat="server">
   <asp: Image runat="server" SkinId="LogoImage" /><br>
   <b>Search Page</b><br>
   Search query: <asp:TextBox runat="server" id="SearchEdit" /><br>
   <asp:Button runat="server" id="GoButton" SkinID="CommandButton"
      Text="Go" />
   <asp:Button runat="server" id="HelpButton" Text="Help" />
</form>
```

Although skin identifiers are included in multiple control elements, in this case, there are no available theme-oriented documents, and the user interface of FIG. 4A reflects a fairly non-thematic tone.

Now suppose that the following theme-oriented document is available and corresponds to the theme applied by the web page text document (line numbering is added for clarity:

```
1.  <asp:Image runat="server" SkinID="LogoImage" ImageURL="ABC.gif" />
2.  <asp:TextBox runat="server" id="SearchEdit" BackColor="#eeeeee" /><br>
3.  <asp: Button runat="server" SkinID="CommandButton" BackColor="#006699"
       ForeColor="#ffffff" Font-Name="Arial" Font-Size="10pt" />
4.  <asp:Button runat="server" BackColor="#cccccc" ForeColor="#000000"
       Font-Name="Arial" Font-Size="10pt" />
```

FIG. 4B illustrates the user interface of FIG. 4A when this theme-oriented document is available. Note how the logo is now applied since the image control element in the web page text document is now rendered in light of the image control element reference of line 1 in the theme-oriented text document. Also, the look and feel of the TextBox and Button control elements has likewise been changed since they are also rendered in light of corresponding control elements references of the theme-oriented text document.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes, which come within the meaning and range of equivalency of the claims, are to be embraced within their scope.

What is claimed is:

1. In computer system for generating a plurality of related web pages for a web site, and wherein information content of each web page is defined by a text web page document established for that page, a method for a applying a theme that defines a look and feel for the plurality of related web pages so that the related web pages will be presented with a consistent look and feel apart from differences in informational content of each web page as defined by that page's text web page document, and wherein the properties associated with the theme may be applied to the plurality of web pages on the site without affecting the text web page document that controls the informational content for each web page, the method comprising the following:

a step for preparing one or more theme-oriented text documents that are each separate and apart from the web page text documents used to control informational content of each of the web pages on the web site, the one or more theme-oriented text documents comprising a plurality of control elements that will be used to create a common look and feel among the plurality of web pages on the web site;

an act of accessing the one of more theme-oriented text documents;

an step for generating a theme control tree that defines a theme class comprised of a plurality of objects to be used for instantiating the control elements of the one or more theme-oriented text documents when rendering the common look and feel of the theme on the related web pages, each said object of the theme control tree corresponding to at least one of the control elements of the plurality of theme-oriented text documents; and wherein the step for generating the theme control tree includes, an act of generating an uncompiled web page theme class based on at least some of the control elements of the theme-oriented text documents by generating source code that defines the uncompiled web page theme class; and an act of compiling the uncompiled web page theme class;

an act of identifying at least one theme control object from the plurality of theme control objects as corresponding to at least one page control object of a page control tree, which was generated in order to define a page class comprised of a plurality of page control objects to be used for instantiating control elements of at least one of the plurality of web pages on the web site; and a step for rendering the at least one of the plurality of web pages on the with a common look and feel define by the theme, without affecting the web page text document of any web page, by executing the at least one theme control object as well as the at least one page control object.

2. In computer system for generating a plurality of related web pages for a web site, and wherein information content of each web page is defined by a text web page document established for that page, a method for a applying a theme that defines a look and feel for the plurality of related web pages so that the related web pages will be presented with a consistent look and feel apart from differences in informational content of each web page as defined by that page's text web page document, and wherein the properties associated with the theme may be applied to the plurality of web pages on the sate without affecting the text web page document that controls the informational content for each web page, the method comprising the following:

a step for preparing one or more theme-oriented text documents that are each separate and apart from the web page text documents used to control informational content of each of the web pages on the web site, the one or more theme-oriented text documents comprising a plurality of control elements that will be used to create a common look and feel among the plurality of web pages on the web site;

an act of accessing the one of more theme-oriented text documents;

an step for generating a theme control tree that defines a theme class comprised of a plurality of objects to be used for instantiating the control elements of the one or more theme-oriented text documents when rendering the common look and feel of the theme on the related web pages, each ,said object of the theme control tree corresponding to at least one of the control elements of the plurality of theme-oriented text documents; and wherein the step for generating the theme control tree includes, an act of generating an uncompiled web page theme class based on at least some of the control elements of the theme-oriented text documents by generating source code that defines the uncompiled web page theme class; and an act of compiling the uncompiled web page theme class;

an act of identifying at least one theme control object from the plurality of theme control objects as corresponding to at least one page control object of a page control tree, which was generated in order to define a page class comprised of a plurality of page control objects to be used for instantiating control elements of at least one of the plurality of web pages on the web site; and a step for rendering the at least one of the plurality of web pages on the with a common look and feel define by the theme, without affecting the web page text document of any web page, by executing the at least one theme control object as well as the at least one page control object.

3. A method in accordance with claims 1 or 2, wherein the control elements of the one or more theme-oriented text documents follows the same schema as at least one control element in one of the text web page documents.

4. A method in accordance with claims 1 or 2, further comprising the following:

an act of receiving a request for a web page from a client computing system.

5. A method in accordance with claim 4, further comprising the following:

an act of downloading and rendering the requested web page to the client computing system.

6. A method in accordance with claims 1 or 2, further comprising the following:

an act of downloading one or more of the rendered web page to a client computing system.

7. A method in accordance with claims 1 or 2, wherein the step for rendering the plurality of web pages on the web site with a common look and feel defined by the theme, without affecting the web page text document of any web page comprises the following:

an act of reading a directive provided from a text web page document.

8. A method in accordance with claim 7, wherein a default rule of a text web page document is that a theme is applied, and wherein the method further comprises the following:

an act of determining that there is nothing that contravenes the default rule.

9. A method in accordance with claim 8, wherein the default rule is based on a configuration setting.

\* \* \* \* \*